(12) United States Patent
Hwang

(10) Patent No.: US 9,346,195 B2
(45) Date of Patent: May 24, 2016

(54) FLEXIBLE SUBSTRATE, METHOD OF MANUFACTURING FLEXIBLE SUBSTRATE, FLEXIBLE DISPLAY DEVICE, AND METHOD OF FLEXIBLE DISPLAY DEVICE

(71) Applicant: SAMSUNG DISPLAY CO., LTD., Yongin, Gyeonggi-Do (KR)

(72) Inventor: Che Ryong Hwang, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 24 days.

(21) Appl. No.: 14/247,336

(22) Filed: Apr. 8, 2014

(65) Prior Publication Data

US 2015/0024220 A1 Jan. 22, 2015

(30) Foreign Application Priority Data

Jul. 18, 2013 (KR) ........................ 10-2013-0084784
Mar. 6, 2014 (KR) ........................ 10-2014-0026686

(51) Int. Cl.
| | | |
|---|---|---|
| *C08K 3/08* | (2006.01) | |
| *B29C 41/22* | (2006.01) | |
| *B29D 11/00* | (2006.01) | |
| *B32B 38/10* | (2006.01) | |
| *G02F 1/1333* | (2006.01) | |
| *B29K 83/00* | (2006.01) | |
| *B29K 79/00* | (2006.01) | |
| *B29K 105/00* | (2006.01) | |
| *B29K 505/14* | (2006.01) | |
| *B29L 31/34* | (2006.01) | |
| *B29L 7/00* | (2006.01) | |
| *B32B 37/24* | (2006.01) | |

(52) U.S. Cl.
CPC ............ *B29C 41/22* (2013.01); *B29D 11/0073* (2013.01); *B32B 38/10* (2013.01); *B29K 2079/08* (2013.01); *B29K 2083/00* (2013.01); *B29K 2105/0073* (2013.01); *B29K 2505/14* (2013.01); *B29K 2995/0094* (2013.01); *B29K 2995/0097* (2013.01); *B29L 2007/008* (2013.01); *B29L 2031/3475* (2013.01); *B32B 2037/243* (2013.01); *B32B 2311/04* (2013.01); *B32B 2457/206* (2013.01); *G02F 1/133305* (2013.01)

(58) Field of Classification Search
CPC .... B29C 41/22; B29D 11/0073; B32B 38/10; C08K 3/08
USPC .................. 524/261–264, 440; 428/412, 446, 428/474.4, 480
See application file for complete search history.

(56) References Cited

FOREIGN PATENT DOCUMENTS

| KR | 10-2011-0123683 A | 11/2011 |
|---|---|---|
| KR | 10-2012-0003664 A | 1/2012 |

*Primary Examiner* — Edward Cain
(74) *Attorney, Agent, or Firm* — Lee & Morse, P.C.

(57) ABSTRACT

A method of manufacturing a flexible substrate includes providing a support, forming an auxiliary layer including a silicon-containing material and a gold (Au) particle on the support, forming a polymer thin film on the auxiliary layer, and removing the support after forming the polymer thin film.

24 Claims, 2 Drawing Sheets

FLEXIBLE SUBSTRATE, METHOD OF MANUFACTURING FLEXIBLE SUBSTRATE, FLEXIBLE DISPLAY DEVICE, AND METHOD OF FLEXIBLE DISPLAY DEVICE

CROSS-REFERENCE TO RELATED APPLICATION

Korean Patent Application No. 10-2013-0084784 filed on Jul. 18, 2013, in the Korean Intellectual Property Office, and entitled: "FLEXIBLE SUBSTRATE, METHOD OF MANUFACTURING FLEXIBLE SUBSTRATE, FLEXIBLE DISPLAY DEVICE, AND METHOD OF FLEXIBLE DISPLAY DEVICE," and Korean Patent Application No. 10-2014-0026686 filed on Mar. 6, 2014, in the Korean Intellectual Property Office, and entitled: "FLEXIBLE SUBSTRATE, METHOD OF MANUFACTURING FLEXIBLE SUBSTRATE, FLEXIBLE DISPLAY DEVICE, AND METHOD OF FLEXIBLE DISPLAY DEVICE," are incorporated by reference herein in its entirety.

BACKGROUND

1. Field

Embodiments relate to flexible substrate, a method of manufacturing a flexible substrate, a flexible display device, and a method of manufacturing a flexible display device.

2. Description of the Related Art

A display device displays an image. Recently, an organic light emitting diode display has been developed as a display device and an illumination device.

Since an organic light emitting diode display has its own light emitting characteristics and does not require a separate light source, unlike a liquid crystal display (LCD), the thickness and the weight of a display device may be reduced. The organic light emitting diode may display exhibits high quality characteristics such as low power consumption, high luminance and high response speed, and the like.

SUMMARY

Embodiments are directed to a method of manufacturing a flexible substrate including providing a support, forming an auxiliary layer including a silicon-containing material and a gold (Au) particle on the support, forming a polymer thin film on the auxiliary layer, and removing the support after forming the polymer thin film.

The silicon-containing material may include a thiol group at a terminal end thereof.

The silicon-containing material may be represented by the following Chemical Formula 1:

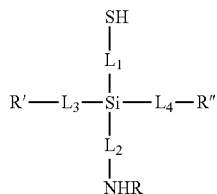

[Chemical Formula 1]

In the above Chemical Formula 1, $L_1$ to $L_4$ are independently a single bond, a substituted or unsubstituted C1 to C30 alkylene group, a substituted or unsubstituted C1 to C30 alkoxylene group, a substituted or unsubstituted C3 to C30 cycloalkylene group, a substituted or unsubstituted C2 to C30 heterocycloalkylene group, a substituted or unsubstituted C6 to C30 arylene group, a substituted or unsubstituted C2 to C30 heteroarylene group, or a combination thereof, and R, R' and R" are independently hydrogen, a substituted or unsubstituted C1 to C30 alkyl group, a substituted or unsubstituted C1 to C30 haloalkyl group, a substituted or unsubstituted C3 to C30 cycloalkyl group, a substituted or unsubstituted C2 to C30 heterocycloalkyl group, a substituted or unsubstituted C6 to C30 aryl group, a substituted or unsubstituted C1 to C30 alkoxy group, a substituted or unsubstituted C6 to C30 aryloxy group, a substituted or unsubstituted C2 to C30 heteroaryl group, a substituted or unsubstituted C6 to C30 arylthiol group, a substituted or unsubstituted amino group, a substituted or unsubstituted silyl group, or a combination thereof.

The silicon-containing material may be represented by the following Chemical Formula 2:

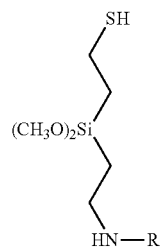

[Chemical Formula 2]

In the above Chemical Formula 2, R is hydrogen, a substituted or unsubstituted C1 to C30 alkyl group, a substituted or unsubstituted C1 to C30 haloalkyl group, a substituted or unsubstituted C3 to C30 cycloalkyl group, a substituted or unsubstituted C2 to C30 heterocycloalkyl group, a substituted or unsubstituted C6 to C30 aryl group, a substituted or unsubstituted C1 to C30 alkoxy group, a substituted or unsubstituted C6 to C30 aryloxy group, a substituted or unsubstituted C2 to C30 heteroaryl group, a substituted or unsubstituted C6 to C30 arylthiol group, a substituted or unsubstituted amino group, a substituted or unsubstituted silyl group, or a combination thereof.

The gold (Au) particle may have a particle diameter of about 5 nm to about 20 nm.

The gold (Au) particle may be positioned on the silicon-containing material.

The polymer thin film may have a thickness of about 1 μm to about 10 μm.

The polymer thin film may include a polyimide, a polycarbonate, a polyethyleneterephthalate, or a combination thereof.

At least one of forming the auxiliary layer and forming the polymer thin film may be performed using a solution.

Removing the support may be performed without using a laser.

Embodiments are also directed to a method of manufacturing a flexible display device including forming an auxiliary layer including a silicon-containing material and a gold (Au) particle on a support, forming a polymer thin film on the auxiliary layer, forming a device on the polymer thin film, and removing the support.

The silicon-containing material may include a thiol group at a terminal end thereof.

The silicon-containing material may be represented by the following Chemical Formula 1:

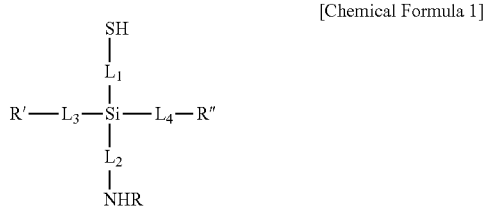
[Chemical Formula 1]

In the above Chemical Formula 1, $L_1$ to $L_4$ are independently a single bond, a substituted or unsubstituted C1 to C30 alkylene group, a substituted or unsubstituted C3 to C30 cycloalkylene group, a substituted or unsubstituted C2 to C30 heterocycloalkylene group, a substituted or unsubstituted C6 to C30 arylene group, a substituted or unsubstituted C2 to C30 heteroarylene group, or a combination thereof, and R, R' and R" are independently hydrogen, a substituted or unsubstituted C1 to C30 alkyl group, a substituted or unsubstituted C1 to C30 haloalkyl group, a substituted or unsubstituted C3 to C30 cycloalkyl group, a substituted or unsubstituted C2 to C30 heterocycloalkyl group, a substituted or unsubstituted C6 to C30 aryl group, a substituted or unsubstituted C1 to C30 alkoxy group, a substituted or unsubstituted C6 to C30 aryloxy group, a substituted or unsubstituted C2 to C30 heteroaryl group, a substituted or unsubstituted C6 to C30 arylthiol group, a substituted or unsubstituted amino group, a substituted or unsubstituted silyl group, or a combination thereof.

The silicon-containing material may be represented by the following Chemical Formula 2:

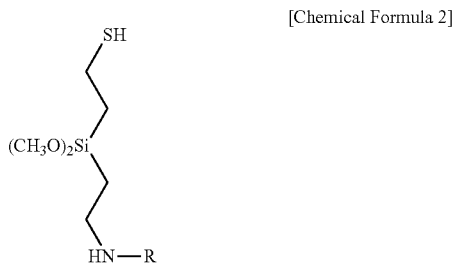
[Chemical Formula 2]

In the above Chemical Formula 2, R is hydrogen, a substituted or unsubstituted C1 to C30 alkyl group, a substituted or unsubstituted C1 to C30 haloalkyl group, a substituted or unsubstituted C3 to C30 cycloalkyl group, a substituted or unsubstituted C2 to C30 heterocycloalkyl group, a substituted or unsubstituted C6 to C30 aryl group, a substituted or unsubstituted C1 to C30 alkoxy group, a substituted or unsubstituted C6 to C30 aryloxy group, a substituted or unsubstituted C2 to C30 heteroaryl group, a substituted or unsubstituted C6 to C30 arylthiol group, a substituted or unsubstituted amino group, a substituted or unsubstituted silyl group, or a combination thereof.

The gold (Au) particle may have a particle diameter of about 5 nm to about 20 nm.

The Au particle may be positioned on the silicon-containing material.

The polymer thin film may have a thickness of about 1 μm to about 10 μm.

The polymer thin film may include a polyimide, a polycarbonate, a polyethyleneterephthalate, or a combination thereof.

At least one of forming the auxiliary layer and forming the polymer thin film may be performed using a solution.

Removing the support may be performed without using a laser.

The device may be a thin film transistor, an organic light emitting diode, a liquid crystal display, or a combination thereof.

The device may include a thin film transistor and an organic light emitting diode that is electrically connected to the thin film transistor.

Embodiments are also directed to a flexible substrate manufactured by the method as claimed in claim 1.

Embodiments are also directed to a flexible substrate manufactured by the method.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
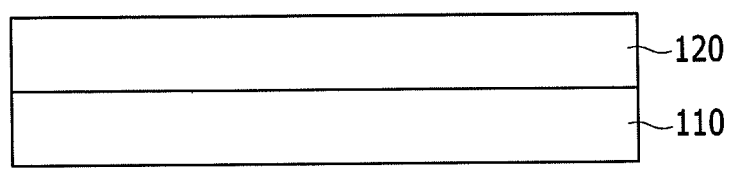
FIGS. 1 to 3 schematically illustrate cross-sectional views showing stages of a method of manufacturing of a flexible substrate according to an embodiment FIGS. 4 to 7 schematically illustrate cross-sectional views showing stages of a method of manufacturing a flexible display device according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, when a definition is not otherwise provided, the term "substituted" refers to one substituted with a substituent selected from deuterium, a C1 to C30 alkyl group, a C6 to C36 aryl group, a C2 to C30 heteroaryl group, a C1 to C30 alkoxy group, a C2 to C30 alkenyl group, a C6 to C30 aryloxy group, a C3 to C40 silyloxy group, a C1 to C30 acyl group, a C2 to C30 acyloxy group, a C2 to C30 heteroaryloxy group, a C1 to C30 sulfonyl group, a C1 to C30 alkylthiol group, a C6 to C30 arylthiol group, a C1 to C30 heterocyclothiol group, a C1 to C30 phosphoric acid amide group, a C3 to C40 silyl group, $NR_1R_2$ (wherein, $R_1$ and $R_2$ are each independently selected from hydrogen, a C1 to C30 alkyl group and a C6 to C30 aryl group), a carboxyl group, a halogen, a cyano group, a nitro group, an azo group, a fluorene group, and a hydroxy group, instead of at least one hydrogen.

As used herein, when a definition is not otherwise provided, the term "hetero" refers to 1 to 3 heteroatoms selected from N B, N, O, S, P, Si and P(=O), and remaining carbon in one ring.

Figure 2:
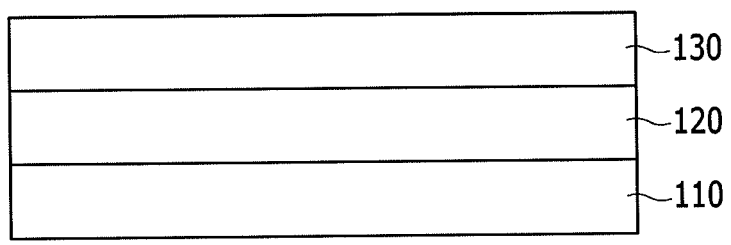
Figure 3:
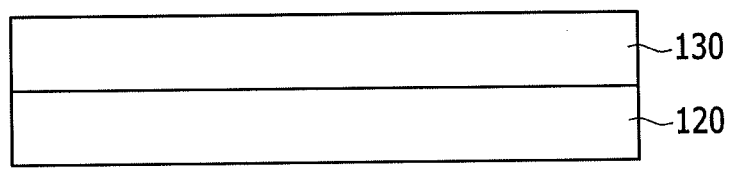
Figure 4:
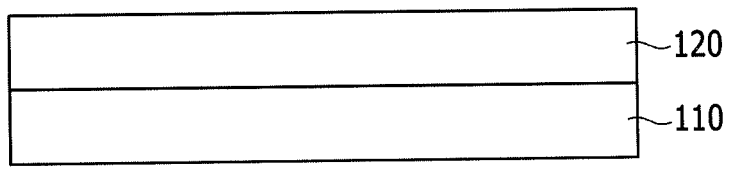
Figure 5:
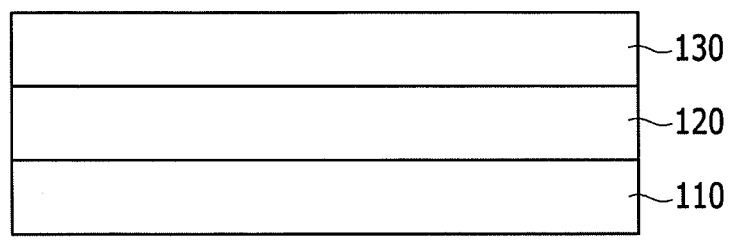
Figure 6:
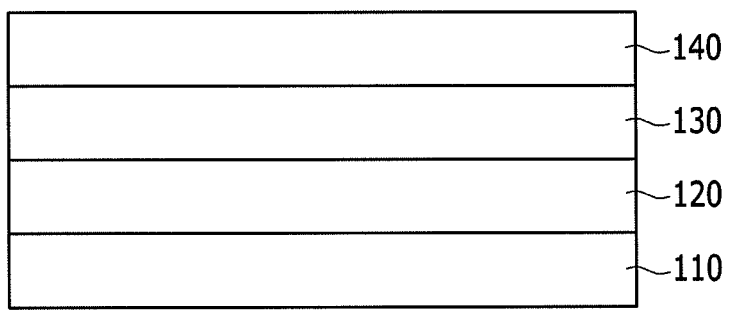

Referring to FIGS. 1 to 3, a method of manufacturing a flexible substrate is described.

FIGS. 1 to 3 are cross-sectional views showing stages of a method for manufacturing of a flexible substrate according to an embodiment.

A support 110 may be prepared or provided as shown in FIG. 1. The support 110 may be made of a material that supports a flexible substrate, for example, glass, a metal, ceramic, or the like.

Subsequently, an auxiliary layer 120 is formed on the support 110.

The auxiliary layer 120 may be formed by coating a solution including a silicon-containing material and a gold (Au) particle. The auxiliary layer 120 may be formed by coating a solution including a silicon-containing material and another solution including gold (Au) on the support 110 in a solution process of, for example, spin coating, slit coating, inkjet coating, spray coating, or the like. The silicon-containing material and the gold (Au) particle may be coated through the above process. Accordingly, the manufacturing process may be simplified and costs may be decreased.

The auxiliary layer 120 may be formed by coating the solution including a silicon-containing material onto the support 110 and then, coating the solution including gold (Au), by simultaneously coating the solution including a silicon-containing material and the solution including gold (Au), or by coating a single solution including a silicon-containing material and gold (Au).

The silicon-containing material may include a monomer, oligomer, or a polymer having a thiol group at the terminal end.

In general, a thiol group is a substituent that forms a strong bond with gold (Au). Herein, the silicon-containing material includes the thiol group, which improves the adherence of the silicon-containing material to the gold (Au) particle. Accordingly, the auxiliary layer 120 may maximize a loss prevention effect due to weak adherence between a polymer thin film 130 and the support 110 and generation of static electricity.

The silicon-containing material may be represented by the following Chemical Formula 1, as an example.

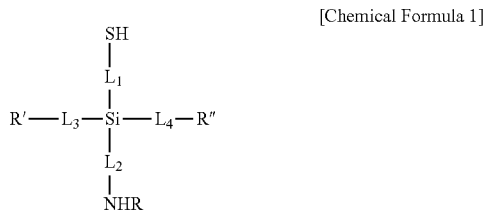

[Chemical Formula 1]

In the above Chemical Formula 1, $L_1$ to $L_4$ are independently a single bond, a substituted or unsubstituted C1 to C30 alkylene group, a substituted or unsubstituted C1 to C30 alkoxylene group, a substituted or unsubstituted C3 to C30 cycloalkylene group, a substituted or unsubstituted C2 to C30 heterocycloalkylene group, a substituted or unsubstituted C6 to C30 arylene group, a substituted or unsubstituted C2 to C30 heteroarylene group, or a combination thereof, and R, R' and R" are independently hydrogen, a substituted or unsubstituted C1 to C30 alkyl group, a substituted or unsubstituted C1 to C30 haloalkyl group, a substituted or unsubstituted C3 to C30 cycloalkyl group, a substituted or unsubstituted C2 to C30 heterocycloalkyl group, a substituted or unsubstituted C6 to C30 aryl group, a substituted or unsubstituted C1 to C30 alkoxy group, a substituted or unsubstituted C6 to C30 aryloxy group, a substituted or unsubstituted C2 to C30 heteroaryl group, a substituted or unsubstituted C6 to C30 arylthiol group, a substituted or unsubstituted amino group, a substituted or unsubstituted silyl group, or a combination thereof.

For example, the silicon-containing material may be represented by the following Chemical Formula 2.

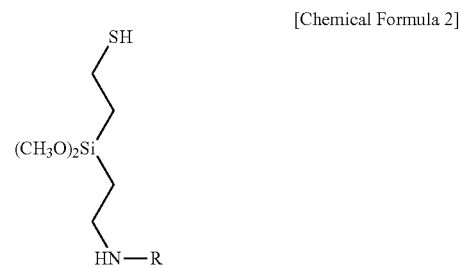

[Chemical Formula 2]

In the above Chemical Formula 2,

R is hydrogen, a substituted or unsubstituted C1 to C30 alkyl group, a substituted or unsubstituted C1 to C30 haloalkyl group, a substituted or unsubstituted C3 to C30 cycloalkyl group, a substituted or unsubstituted C2 to C30 heterocycloalkyl group, a substituted or unsubstituted C6 to C30 aryl group, a substituted or unsubstituted C1 to C30 alkoxy group, a substituted or unsubstituted C6 to C30 aryloxy group, a substituted or unsubstituted C2 to C30 heteroaryl group, a substituted or unsubstituted C6 to C30 arylthiol group, a substituted or unsubstituted amino group, a substituted or unsubstituted silyl group, or a combination thereof. For example, the R may be hydrogen, a substituted or unsubstituted C1 to C30 alkyl group, a substituted or unsubstituted C3 to C30 cycloalkyl group, a substituted or unsubstituted C6 to C30 aryl group, or a substituted or unsubstituted C2 to C30 heteroaryl group.

The auxiliary layer 120 may include a silicon-containing material and thus, may adjust the adherence of the polymer thin film 130 to the support 110 such as glass or the like. The silicon-containing material may weaken the adherence of the polymer thin film 130 to the support 110, such that the support 110 may be more easily removed from the polymer thin film 130.

The auxiliary layer 120 may include a gold (Au) particle. The gold (Au) particle may prevent a loss due to generation of static electricity and may adjust the adherence of the polymer thin film 130 to the support 110. The gold (Au) particle has high conductivity. The gold (Au) particle may absorb static electricity generated when the support 110 is removed from the polymer thin film 130, and may prevent the static electricity from being transferred to a device. In addition, the gold (Au) particle may weaken adherence of the support 110 to the polymer thin film 130, such that the support 110 may be easily removed from the polymer thin film 130.

The gold (Au) particle may have a particle diameter of about 5 nm to about 20 nm. The gold (Au) particle may be positioned on the silicon-containing material. When the gold (Au) particle has a diameter within this range, adherence between the silicon-containing material and the gold (Au) particle may be further improved due to the thiol group in the silicon-containing material.

Referring to FIG. 2, the polymer thin film 130 may be formed on the auxiliary layer 120.

The polymer thin film 130 may be, for example a polyimide, a polyethyleneterephthalate, a polycarbonate, an epoxy, a polyethylene, a polyacrylate, or a combination thereof. The polymer thin film 130 may be, for example, a polyimide, a polycarbonate, a polyethyleneterephthalate, or a combination thereof. The polymer thin film 130 may be, for example, a polyimide.

The auxiliary layer 120 or the polymer thin film 130 may be coated by a solution process such as spin coating, slit coating, inkjet coating, or the like. For example, the polymer thin film 130 may be spin-coated on the auxiliary layer 120.

The polymer thin film 130 may have a thickness of about 1 µm to about 10 µm. When the polymer thin film 130 has a thickness within this range, flexibility of a flexible substrate and a flexible display device may be improved.

Referring to FIG. 3, the support 110 may be removed from the polymer thin film 130.

The support 110 may be removed by a physical method without using a laser. Herein, the term "physical method" refers to a method of separating a target object by applying a predetermined force without using a laser or a chemical liquid.

The physical method of removing the support 110 does not use a laser but may remove the support 110 without generating static electricity or the like.

When the support 110 is removed, the auxiliary layer 120 may be left on one side of the polymer thin film 130. The gold (Au) particles of the auxiliary layer 120 may have static electricity, but the static electricity may be blocked by the polymer thin film 130 and may have no other negative influence on a device.

Hereinafter, a method of manufacturing a flexible display device is described with reference to FIGS. 4 to 7.

Figure 7:
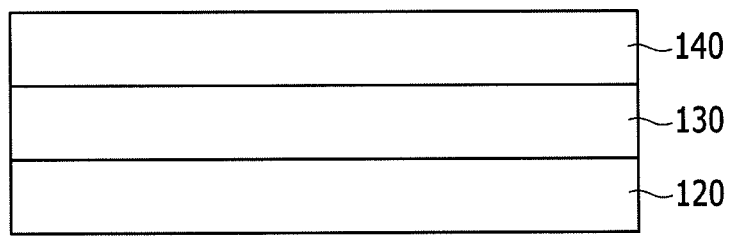

The flexible display device may be manufactured by forming the auxiliary layer 120 including a silicon-containing material and a gold (Au) particle on the support 110 (FIG. 4), forming the polymer thin film 130 on the auxiliary layer 120 (FIG. 5), forming a device 140 on the polymer thin film 130 (FIG. 6), and removing the support 110 (FIG. 7).

In this method of manufacturing the flexible display device, the silicon-containing material, the gold (Au) particle, the polymer thin film 130, the solution process, and the like may be the same as illustrated in the method of manufacturing a flexible substrate.

The device 140 may be a thin film transistor, an organic light emitting diode, a liquid crystal display, or a combination thereof. For example, the device 140 may include a thin film transistor, an organic light emitting diode that is electrically connected to the thin film transistor. More specifically, a display part (DP) displaying an image may be formed by forming an active layer (AC) including a source area (SA), a channel area (CA), and a drain area (DA) and a plurality of thin film transistors (TFT) including a gate electrode (GA), a source electrode (SO), and a drain electrode (DR) on the polymer thin film 130 in a process of forming a thin film transistor, an organic light emitting diode (OLED) including a first electrode E1 connected to the thin film transistors (TFT), an organic emission layer (EL), and a second electrode E2, and a thin film encapsulation part (EN) encapsulating the organic light emitting diode (OLED).

The first electrode and second electrode of the organic light emitting diode may be an anode and/or a cathode. For example, when the first electrode is an anode, the second electrode may be a cathode, and when the first electrode is a cathode, the second electrode may be an anode.

The anode may be a transparent electrode or an opaque electrode. The transparent electrode may be formed of, for example conductive oxide such as indium tin oxide (ITO), indium zinc oxide (IZO), tin oxide ($SnO_2$), zinc oxide (ZnO), or a combination thereof, or a metal such as aluminum silver, or magnesium, in a thin thickness, and the opaque electrode may be made of, for example a metal such as aluminum silver, or magnesium.

The cathode may include a material having a small work function, such that electrons may be easily injected thereinto. For example, the material having a small work function may include a metal such as magnesium, calcium, sodium, potassium, titanium, indium, yttrium, lithium, gadolinium, aluminum silver, tin, lead, cesium, barium, or the like or an alloy thereof, or may be a multi-layer structure material such as LiF/Al, $LiO_2$/Al, LiF/Ca, LiF/Al, and $BaF_2$/Ca, or the like. The cathode may be a metal electrode such as aluminum or the like.

As described above, the organic light emitting diode includes an anode and a cathode facing each other, and an emission layer interposed between the anode and the cathode. The organic light emitting diode may further include a hole transport layer (HTL) between the anode and the emission layer, and may further include an electron transport layer (ETL) between the cathode and the emission layer. In addition, the organic light emitting diode may further include a hole injection layer (HIL) between the anode and the hole transport layer (HTL), and an electron injection layer (EIL) between the cathode and the electron transport layer (ETL).

For example, the organic light emitting diode may have a structure of anode/hole injection layer (HIL)/emission layer/cathode, anode/hole injection layer (HIL)/hole transport layer (HTL)/emission layer/electron transport layer (ETL)/cathode, or anode/hole injection layer (HIL)/hole transport layer (HTL)/emission layer/electron transport layer (ETL)/electron injection layer (EIL)/cathode. The organic light emitting diode may have a structure of anode/functional layer having a hole injection function and a hole transport function simultaneously/emission layer/electron transport layer (ETL)/cathode, or anode/functional layer having a hole injection function and a hole transport function simultaneously/emission layer/electron transport layer (ETL)/electron injection layer (EIL)/cathode. Or, the organic light emitting diode may have a structure of anode/hole transport layer (HTL)/emission layer/functional layer having electron injection and electron transport function simultaneously/cathode, anode/hole injection layer (HIL)/emission layer/functional layer having electron injection and electron transport function simultaneously/cathode, or anode/hole injection layer (HIL)/hole transport layer (HTL)/emission layer/functional layer having electron injection and electron transport function simultaneously/cathode.

The emission layer may include only a single organic compound or may include a mixture of the compound and another organic compound. In the mixture, a compound that is provided in a larger amount may function as a fluorescent or phosphorescent host, and a compound that is provided in a lesser amount may function as a dopant.

A host material may be, for example, 9,10-di(naphthalen-2-yl)anthracene (ADN), or the like.

A red dopants may be, for example, PtOEP, Ir(piq)$_3$, Btp$_2$Ir (acac), DCJTB, or the like.

A blue dopant may be, for example, Ir(ppy)$_3$ (ppy=phenylpyridine), Ir(ppy)$_2$(acac), Ir(mpyp)$_3$, C545T, or the like.

A blue dopant may be, for example, F$_2$Irpic, (F$_2$ppy)$_2$, Ir(tmd), Ir(dfppz)$_3$, ter-fluorene, 4,4'-bis (4-diphenylaminostyryl)biphenyl (DPAVBi), 2,5,8,11-tetra-ter-butyl perylene (TBP), or the like.

A content of the dopant may be, for example, about 0.1 to about 15 parts by weight based on the total weight, 100 parts by weight of an emission layer-forming material (i.e., a total weight of the host and dopant is 100 parts by weight). Within the above range of the dopant, a concentration extinction phenomenon may be substantially suppressed.

The emission layer may emit white light by a combination of red, green, and blue primary colors. The combination of colors may be implemented by a combination of adjacent sub-pixels to emit white light or by stack in a vertical direction to emit white light.

The hole transport layer (HTL) may include a suitable hole transport material. For example, the hole transport material may be a carbazole derivative such as N-phenylcarbazole, polyvinylcarbazole, 4,4',4"-tris(carbazol-9-yl)-tripheny-lamine (TCTA) and the like, an amine derivative having an aromatic condensed ring such as NPB, N,N'-bis(3-methylphenyl)-N,N'-diphenyl-[1,1-biphenyl]-4,4'-diamine (TPD), or the like. TCTA may prevent diffusion of excitons from the emission layer while transporting holes.

The electron transport layer (ETL) may include a suitable electron transport material. For example, a material such as a quinoline derivative, particularly tris(8-quinolinolate)aluminum $Alq_3$, TAZ, Balq, and the like may be used.

The hole injection layer (HIL) may include a suitable known hole injection material, for example, a phthalocyanine compound such as copper phthalocyanine or the like, m-MT-DATA[4,4',4"-tris(3-methylphenylphenylamino)triphenylamine], NPB (N,N'-di(1-naphthyl)-N,N'-diphenylbenzidine), TDATA, 2T-NATA, PANI/DBSA (polyaniline/dodecylbenzenesulfonic acid), PEDOT/PSS (poly(3,4-ethylenedioxythiophene)/poly (4-styrenesulfonate)), PANI/CSA (polyaniline/camphor sulfonic acid), or PANI/PSS (polyaniline)/poly (4-styrenesulfonate)), or the like.

The electron injection layer (EIL) may include a suitable material for forming an electron injection layer (EIL), such as LiF, NaCl, CsF, $Li_2O$, BaO or the like.

The display part (DP) of the device 140 may include, for example, a plurality of thin film transistors (TFT), an organic light emitting diode (OLED), and a thin film encapsulation part (EN) and may be manufactured as various structures.

The support 110 may be removed without using a laser and without generating static electricity or the like.

If a laser were to be radiated while removing the support 110, static electricity could be generated between the support 110 and the polymer thin film 130 and could change characteristics of thin film transistors of the device 140 on the polymer thin film 130 and damage an active interface. For example, a voltage threshold of a thin film transistor could be moved in a positive direction. As a result, a device 140 may not be stably operated due to generation of a hump and reliability of the display device 140 may deteriorate.

However, embodiments described herein, in which the support 110 is removed without using a laser, may avoid the generation of static electricity and may effectively lower manufacturing costs.

In addition, the support 110, such as a glass substrate or the like, may be more easily detached from the polymer thin film 130 by inserting the auxiliary layer 120 according to one embodiment or another embodiment.

A silicon-containing material and a gold (Au) particle in the auxiliary layer 120 may weaken adherence of the polymer thin film 130 to the support 110, such as a glass substrate or the like, such that the support 110 may be physically detached from the polymer thin film 130. The gold (Au) particle has conductivity and may hold static electricity generated when the support 110 is detached from the polymer thin film 130.

Thus, the use of the silicon-containing material and gold (Au) particle may prevent a loss or damage to a device 140 formed on the polymer thin film 130 due to static electricity.

When the support 110 is removed, the auxiliary layer 120 may left on one side of the polymer thin film 130. The gold (Au) particle of the auxiliary layer 120 may hold static electricity, but the static electricity may be blocked by the polymer thin film 130 and may have no influence on a device on the other side of the polymer thin film 130.

In addition, embodiments provide a flexible substrate manufactured according to the method of manufacturing a flexible substrate and a flexible display device manufactured according to the method of manufacturing a flexible display device.

The flexible substrate, the flexible display device, and each constituent element thereof may be the same as illustrated in the method of manufacturing the flexible substrate and the flexible display device as described above.

The following Examples and Comparative Examples are provided in order to highlight characteristics of one or more embodiments, but it is to be understood that the Examples and Comparative Examples are not to be construed as limiting the scope of the embodiments, nor are the Comparative Examples to be construed as being outside the scope of the embodiments. Further, it is to be understood that the embodiments are not limited to the particular details described in the Examples and Comparative Examples.

Manufacture of Flexible Substrate

PREPARATION EXAMPLE 1

An auxiliary layer 120 was formed on a glass substrate by coating a silicon-containing material represented by the following Chemical Formula 3 by a solution process, subsequently coating a gold (Au) particle having a particle diameter of 10 nm by a solution process and performing heat-treating drying. Subsequently, a polyimide thin film was formed by spin-coating polyamic acid on the auxiliary layer 120 and performing heat-treating, thereby manufacturing a flexible substrate. The glass substrate was physically removed from the flexible substrate without using a laser.

[Chemical Formula 3]

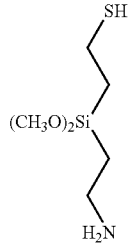

PREPARATION EXAMPLE 2

A flexible substrate was manufactured according to the same method as Preparation Example 1 except for using a silicon-containing material represented by the following Chemical Formula 4 instead of the silicon-containing material represented by the above Chemical Formula 3.

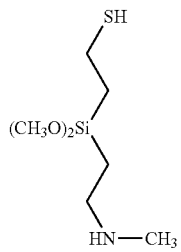

[Chemical Formula 4]

COMPARATIVE PREPARATION EXAMPLE 1

A flexible substrate was manufactured according to the same method as Preparation Example 1 except for forming no auxiliary layer 120.

COMPARATIVE PREPARATION EXAMPLE 2

A flexible substrate was manufactured according to the same method as Preparation Example 1, except for using an auxiliary layer that did not include a silicon-containing material, instead of the auxiliary layer 120 according to Example 1.

COMPARATIVE PREPARATION EXAMPLE 3

A flexible substrate was manufactured according to the same method as Preparation Example 1 except for using an auxiliary layer that did not include an Au particle, instead of the auxiliary layer 120 according to Preparation Example 1.

Manufacture of Flexible Display Device

EXAMPLE 1

An organic light emitting diode was manufactured by forming a thin film transistor on the flexible substrate according to Preparation Example 1 (before removing the glass substrate) and forming a display part displaying an image. Subsequently, a flexible display device was manufactured by forming a thin film encapsulation on the display part and physically removing the glass substrate from the auxiliary layer 120 without radiating a laser.

EXAMPLE 2

A flexible display device was manufactured according to the same method as Example 1 except for using the flexible substrate according to Preparation Example 2 instead of the flexible substrate according to Preparation Example 1.

COMPARATIVE EXAMPLE 1

A flexible display device was manufactured according to the same method as Example 1 except for using the flexible substrate according to Comparative Preparation Example 1 instead of the flexible substrate according to Preparation Example 1 and removing the glass substrate from the polyimide layer by radiating a laser, rather than physically removing the glass substrate.

COMPARATIVE EXAMPLE 2

A flexible display device was manufactured according to the same method as Example 1 except for using the flexible substrate according to Comparative Preparation Example 1, instead of the flexible substrate according to Preparation Example 1.

COMPARATIVE EXAMPLE 3

A flexible display device was manufactured according to the same method as Example 1 except for using the flexible substrate according to Comparative Preparation Example 2, instead of the flexible substrate according to Preparation Example 1.

COMPARATIVE EXAMPLE 4

A flexible display device was manufactured according to the same method as Example 1 except for using the flexible substrate according to Comparative Preparation Example 3, instead of the flexible substrate according to Preparation Example 1.

Evaluation

The flexible display devices according to Example 1 and Comparative Examples 1 to 4 were evaluated as to whether the glass substrate was removed and as to whether static electricity was generated when the glass substrate was removed.

The glass removal was evaluated by marking ○/X.
○: glass was cleanly removed.
X: glass was not cleanly removed.
The generation of static electricity was also evaluated by marking ○/X.
○: static electricity was generated.
X: static electricity was not generated.
The results are provided in Table 1.

TABLE 1

| | Auxiliary layer | Method of removing glass | Removal of glass | Static electricity when glass is removed |
|---|---|---|---|---|
| Example 1 | Si polymer material + Au particle | physical method | ○ | X |
| Example 2 | Si polymer material + Au particle | physical method | ○ | X |
| Comparative Example 1 | — | laser radiation | ○ | ○ |
| Comparative Example 2 | — | physical method | X | ○ |
| Comparative Example 3 | Au particle | physical method | X | X |
| Comparative Example 4 | Si polymer material | physical method | ○ | ○ |

Referring to Table 1, regarding the flexible display devices including an auxiliary layer including a Si polymer material and an Au particle according to Examples 1 and 2 the glass substrate was cleanly removed by a physical method, and no static electricity was generated. Regarding the flexible display device according to Comparative Example 1, including no auxiliary layer, the glass substrate was removed by laser radiation, but static electricity was generated. Regarding the flexible display device according to Comparative Example 2, including no auxiliary layer, the glass substrate was not cleanly removed by a physical method. Regarding the flexible display device including an auxiliary layer including an Au particle according to Comparative Example 3, the glass substrate was not cleanly removed by the physical method. Regarding the flexible display device including an auxiliary layer including only a Si polymer material according to Comparative Example 4, the glass substrate was removed, but static electricity was generated.

The flexible display devices according to Examples 1 and 2 included a Si polymer material in an auxiliary layer, such that a glass substrate was be cleanly removed, and included an Au particle in the auxiliary layer such that a generation of static electricity was prevented or minimized. In addition, since the glass was able to be physically removed without using a laser, the flexible display devices were economical of manufacture.

By way of summation and review, a display device such as an organic light emitting diode (OLED) display generally includes a substrate such as a glass substrate and the like and a device positioned on the substrate. Recently, research has been conducted on manufacturing a flexible substrate and providing a display device as a flexible display device.

A flexible substrate has flexible characteristics and may be supported by a support such as a glass substrate when a process is performed on the flexible substrate, and then, may be detached from the support when the process is complete. The flexible substrate may be detached from the support by using a laser. However, a laser may generate static electricity and thus, may deteriorate the reliability of a display device. Moreover, use of a laser adds to manufacturing costs.

Embodiments provide a method of manufacturing a flexible substrate by detaching a support without using a laser. Embodiments also provide a method of manufacturing a flexible display device by detaching a support from the flexible substrate without using a laser. Accordingly, the generation of defects in the flexible substrate due to static electricity when the support is removed from the flexible display device may be prevented or minimized, and manufacturing costs may be reduced. Embodiment provides a flexible substrate and display device manufactured according the manufacturing method.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A method of manufacturing a flexible substrate, the method comprising
providing a support,
forming an auxiliary layer including a silicon-containing material and gold (Au) particles on the support,
forming a polymer thin film on the auxiliary layer, and
removing the support after forming the polymer thin film.

2. The method as claimed in claim 1, wherein the silicon-containing material includes a thiol group at a terminal end thereof.

3. The method as claimed in claim 2, wherein the silicon-containing material is represented by the following Chemical Formula 1:

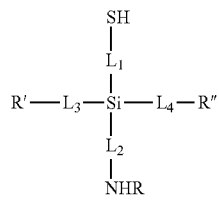

[Chemical Formula 1]

wherein, in the above Chemical Formula 1,
$L_1$ to $L_4$ are independently a single bond, a substituted or unsubstituted C1 to C30 alkylene group, a substituted or unsubstituted C1 to C30 alkoxylene group, a substituted or unsubstituted C3 to C30 cycloalkylene group, a substituted or unsubstituted C2 to C30 heterocycloalkylene group, a substituted or unsubstituted C6 to C30 arylene group, a substituted or unsubstituted C2 to C30 heteroarylene group, or a combination thereof, and
R, R' and R" are independently hydrogen, a substituted or unsubstituted C1 to C30 alkyl group, a substituted or unsubstituted C1 to C30 haloalkyl group, a substituted or unsubstituted C3 to C30 cycloalkyl group, a substituted or unsubstituted C2 to C30 heterocycloalkyl group, a substituted or unsubstituted C6 to C30 aryl group, a substituted or unsubstituted C1 to C30 alkoxy group, a substituted or unsubstituted C6 to C30 aryloxy group, a substituted or unsubstituted C2 to C30 heteroaryl group, a substituted or unsubstituted C6 to C30 arylthiol group, a substituted or unsubstituted amino group, a substituted or unsubstituted silyl group, or a combination thereof.

4. The method as claimed in claim 3, wherein the silicon-containing material is represented by the following Chemical Formula 2:

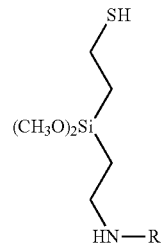

[Chemical Formula 2]

wherein, in the above Chemical Formula 2,
R is hydrogen, a substituted or unsubstituted C1 to C30 alkyl group, a substituted or unsubstituted C1 to C30 haloalkyl group, a substituted or unsubstituted C3 to C30 cycloalkyl group, a substituted or unsubstituted C2 to C30 heterocycloalkyl group, a substituted or unsubstituted C6 to C30 aryl group, a substituted or unsubstituted C1 to C30 alkoxy group, a substituted or unsubstituted C6 to C30 aryloxy group, a substituted or unsubstituted C2 to C30 heteroaryl group, a substituted or unsubstituted C6 to C30 arylthiol group, a substituted or unsubstituted amino group, a substituted or unsubstituted silyl group, or a combination thereof.

5. The method as claimed in claim 1, wherein each of the gold (Au) particles has a particle diameter of about 5 nm to about 20 nm.

6. The method as claimed in claim 1, wherein the gold (Au) particles are positioned on the silicon-containing material.

7. The method as claimed in claim 1, wherein the polymer thin film has a thickness of about 1 μm to about 10 μm.

8. The method as claimed in claim 1, wherein the polymer thin film includes a polyimide, a polycarbonate, a polyethyleneterephthalate, or a combination thereof.

9. The method as claimed in claim 1, wherein at least one of forming the auxiliary layer and forming the polymer thin film is performed using a solution.

10. The method as claimed in claim 1, wherein removing the support is performed without using a laser.

11. A method of manufacturing a flexible display device, the method comprising
forming an auxiliary layer including a silicon-containing material and gold (Au) particles on a support,
forming a polymer thin film on the auxiliary layer,
forming a device on the polymer thin film, and
removing the support.

12. The method as claimed in claim 11, wherein the silicon-containing material includes a thiol group at a terminal end thereof.

13. The method as claimed in claim 12, wherein the silicon-containing material is represented by the following Chemical Formula 1:

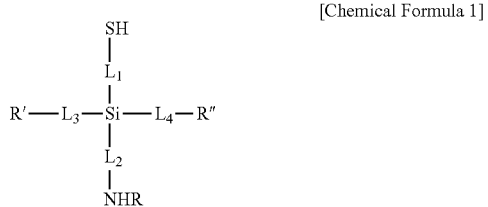

[Chemical Formula 1]

wherein, in the above Chemical Formula 1,
$L_1$ to $L_4$ are independently a single bond, a substituted or unsubstituted C1 to C30 alkylene group, a substituted or unsubstituted C3 to C30 cycloalkylene group, a substituted or unsubstituted C2 to C30 heterocycloalkylene group, a substituted or unsubstituted C6 to C30 arylene group, a substituted or unsubstituted C2 to C30 heteroarylene group, or a combination thereof, and
R, R' and R" are independently hydrogen, a substituted or unsubstituted C1 to C30 alkyl group, a substituted or unsubstituted C1 to C30 haloalkyl group, a substituted or unsubstituted C3 to C30 cycloalkyl group, a substituted or unsubstituted C2 to C30 heterocycloalkyl group, a substituted or unsubstituted C6 to C30 aryl group, a substituted or unsubstituted C1 to C30 alkoxy group, a substituted or unsubstituted C6 to C30 aryloxy group, a substituted or unsubstituted C2 to C30 heteroaryl group, a substituted or unsubstituted C6 to C30 arylthiol group, a substituted or unsubstituted amino group, a substituted or unsubstituted silyl group, or a combination thereof.

14. The method as claimed in claim 13, wherein the silicon-containing material is represented by the following Chemical Formula 2:

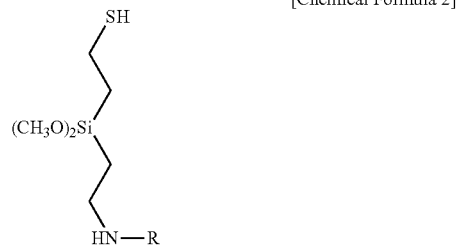

[Chemical Formula 2]

wherein, in the above Chemical Formula 2,
R is hydrogen, a substituted or unsubstituted C1 to C30 alkyl group, a substituted or unsubstituted C1 to C30 haloalkyl group, a substituted or unsubstituted C3 to C30 cycloalkyl group, a substituted or unsubstituted C2 to C30 heterocycloalkyl group, a substituted or unsubstituted C6 to C30 aryl group, a substituted or unsubstituted C1 to C30 alkoxy group, a substituted or unsubstituted C6 to C30 aryloxy group, a substituted or unsubstituted C2 to C30 heteroaryl group, a substituted or unsubstituted C6 to C30 arylthiol group, a substituted or unsubstituted amino group, a substituted or unsubstituted silyl group, or a combination thereof.

15. The method as claimed in claim 11, wherein each of the gold (Au) particles has a particle diameter of about 5 nm to about 20 nm.

16. The method as claimed in claim 11, wherein the gold particles are positioned on the silicon-containing material.

17. The method as claimed in claim 11, wherein the polymer thin film has a thickness of about 1 μm to about 10 μm.

18. The method as claimed in claim 11, wherein the polymer thin film includes a polyimide, a polycarbonate, a polyethyleneterephthalate, or a combination thereof.

19. The method as claimed in claim 11, wherein at least one of forming the auxiliary layer and forming the polymer thin film is performed using a solution.

20. The method as claimed in claim 11, wherein removing the support is performed without using a laser.

21. The method as claimed in claim 11, wherein the device is a thin film transistor, an organic light emitting diode, a liquid crystal display, or a combination thereof.

22. The method as claimed in claim 21, wherein the device includes a thin film transistor and an organic light emitting diode that is electrically connected to the thin film transistor.

23. A flexible substrate manufactured by the method as claimed in claim 1.

24. A flexible substrate manufactured by the method as claimed in claim 11.

* * * * *